(12) United States Patent
Wang et al.

(10) Patent No.: US 8,547,207 B2
(45) Date of Patent: Oct. 1, 2013

(54) RFID CONVERTER MODULE

(75) Inventors: Steve Wang, Mickelton, NJ (US); Ben J. Wild, San Francisco, CA (US)

(73) Assignee: Checkpoint System, Inc., Thorofare, NJ (US)

( * ) Notice: Subject to any disclaimer, the term of this patent is extended or adjusted under 35 U.S.C. 154(b) by 349 days.

(21) Appl. No.: 13/042,917

(22) Filed: Mar. 8, 2011

(65) Prior Publication Data

US 2011/0221572 A1 Sep. 15, 2011

Related U.S. Application Data

(60) Provisional application No. 61/312,898, filed on Mar. 11, 2010.

(51) Int. Cl.
*H04Q 5/22* (2006.01)

(52) U.S. Cl.
USPC ........................................... 340/10.1

(58) Field of Classification Search
USPC ................... 340/10.1, 572.1, 572.7; 343/860
See application file for complete search history.

(56) References Cited

U.S. PATENT DOCUMENTS

| | | | |
|---|---|---|---|
| 4,622,557 A | 11/1986 | Westerfield | |
| 5,459,873 A | 10/1995 | Moore et al. | |
| 5,758,294 A | 5/1998 | Ganesan et al. | |
| 6,075,972 A | 6/2000 | Laubach et al. | |
| 6,125,266 A | 9/2000 | Matero et al. | |
| 6,215,988 B1 | 4/2001 | Matero | |
| 6,243,569 B1 | 6/2001 | Atkinson | |
| 6,362,738 B1 | 3/2002 | Vega | |
| 6,397,044 B1 | 5/2002 | Nash et al. | |
| 6,658,237 B1 | 12/2003 | Rozenblit et al. | |
| 7,079,596 B1 | 7/2006 | Namura | |
| 7,162,218 B2 | 1/2007 | Axness et al. | |
| 7,206,551 B2 | 4/2007 | Itakura et al. | |
| 7,215,976 B2 * | 5/2007 | Brideglall | 455/552.1 |
| 7,260,360 B2 | 8/2007 | Seo et al. | |
| 7,359,672 B2 | 4/2008 | Lynch | |

(Continued)

FOREIGN PATENT DOCUMENTS

| | | |
|---|---|---|
| EP | 2221748 A1 | 8/2010 |
| WO | 0150407 A1 | 7/2001 |
| WO | 2010044041 A1 | 4/2010 |

OTHER PUBLICATIONS

PCT International Search Report No. PCT/US2011/027973 dated Mar. 10, 2011 and Written Opinion of the International Authority.

*Primary Examiner* — Vernal Brown
(74) *Attorney, Agent, or Firm* — Caesar, Rivise, Bernstein, Cohen & Pokotilow, Ltd.

(57) ABSTRACT

A tag communication method includes providing a tag reader operating at a first frequency and having transmit and receive antenna ports, providing a frequency converter module having transmit and receive plugs adapted to directly mate with the transmit and receive ports, and directly mating the transmit plug with the transmit port and the receive plug with the receive port. A transmit signal at the first frequency is received from the reader by the converter module by way of the directly mated transmit plug and converted to a second frequency differing from the first frequency to provide a converted transmit signal which is transmitted to the tag. A receive signal is received from the tag at the second frequency and converted to the first frequency to provide a converted receive signal which is applied by the conversion module to the reader by way of the directly mated receive plug.

13 Claims, 4 Drawing Sheets

(56) References Cited

U.S. PATENT DOCUMENTS

| | | |
|---|---|---|
| 7,359,684 B2 | 4/2008 | Bellaouar et al. |
| 7,460,846 B2 | 12/2008 | Maalismaa et al. |
| 7,526,018 B2 | 4/2009 | Seo et al. |
| 7,548,737 B2 | 6/2009 | Domino et al. |
| 7,616,092 B2 * | 11/2009 | Shafer et al. ............. 340/10.1 |
| 7,636,554 B2 | 12/2009 | Sugar et al. |
| 7,777,630 B2 * | 8/2010 | Tuttle ...................... 340/572.7 |
| 7,826,865 B2 * | 11/2010 | Rofougaran ............. 455/552.1 |
| 7,840,989 B2 | 11/2010 | Bertonis et al. |
| 7,848,458 B2 | 12/2010 | Ochiai et al. |
| 7,881,181 B2 | 2/2011 | Dapper et al. |
| 2007/0046470 A1 | 3/2007 | Pempsell et al. |
| 2008/0061984 A1 | 3/2008 | Breed et al. |
| 2008/0136646 A1 | 6/2008 | Friedrich |
| 2009/0016260 A1 | 1/2009 | Thesling |
| 2009/0066516 A1 | 3/2009 | Lazo |
| 2009/0117938 A1 | 5/2009 | Georgantas et al. |

* cited by examiner

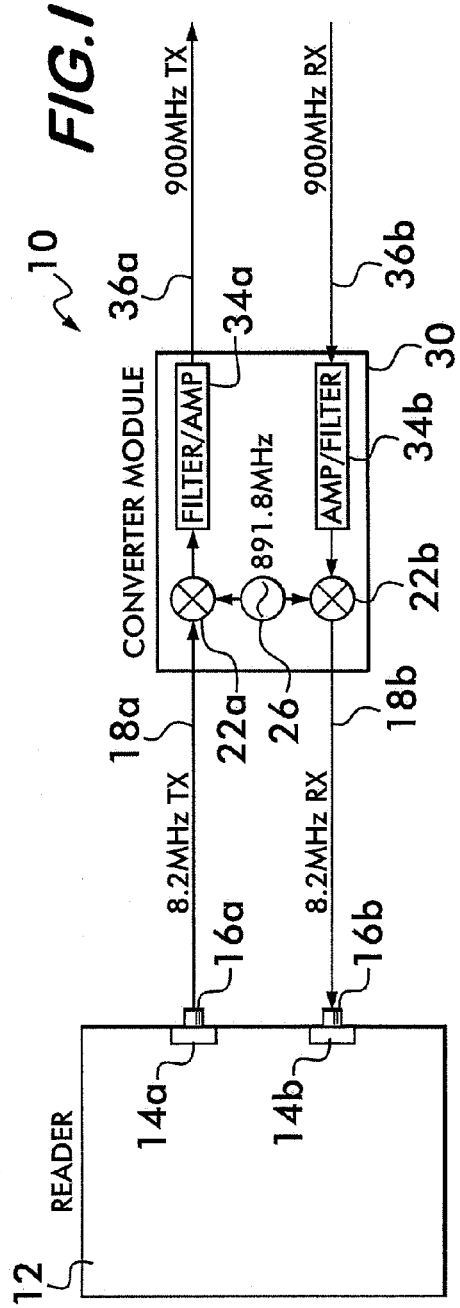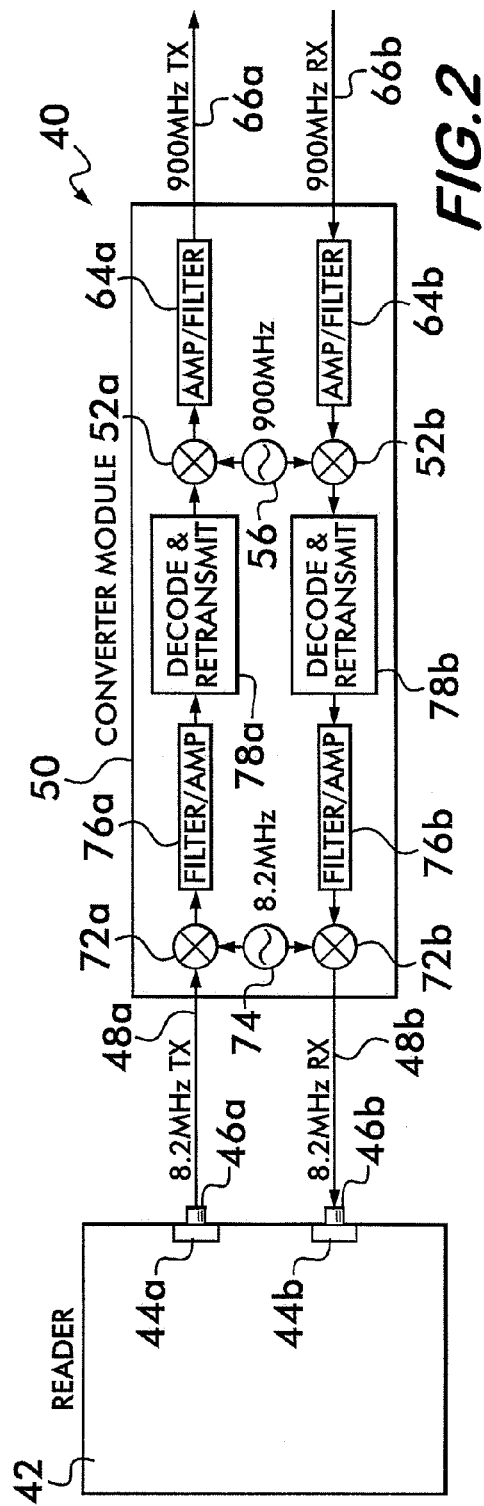

RFID CONVERTER MODULE

BACKGROUND OF THE INVENTION

1. Field of Invention

The present invention generally relates to the field of security tags, and more particularly, to a system and method for adding functionality to security tag readers.

2. Description of Related Art

Several references disclose receiving radio frequency signals at one frequency and retransmitting them at a different frequency. For example, U.S. Pat. No. 4,622,557, issued to Westerfield on Nov. 11, 1986, discloses reception, downconversion and retransmission of GPS satellite signals in a system for determining a splashdown location by sonobuoys. The sonobuoys receive the GPS satellite signals, and downconvert them to a baseband frequency using frequency multipliers and filters. A local oscillator and a frequency synthesizer are used to modulate the signal at the new transmit frequency. The modulated signals at the new transmit frequency are then transmitted to an aircraft.

U.S. Patent Publication No. 2009/0016260 A1 by Thesling discloses a gateway for receiving a radio frequency signal at one frequency and transmitting it on one of a plurality of different frequency channels based on priority determinations. U.S. Pat. Nos. 6,215,988 (Matero), 6,397,044 (Nash) and 7,162,218 (Axness) also disclose receiving and transmitting radio frequency signals at different frequencies. However, none of the foregoing references disclose a method for converting tag reader devices operating at one frequency into tag reader devices capable of operating at different frequencies.

Additionally, U.S. Pat. No. 6,075,972, issued on Jun. 13, 2000 to Laubach, discloses a CATV network having transmitter and receiver appliqué modules. The appliqué modules are added to the network to increase network functionality. A signal from a cable modem at the home of the user in the Laubach network is received from a cable modem at a first frequency by a transmitter appliqué. The transmitter appliqué upconverts the signal is to a second frequency. The transmitter appliqué then transmits the upconverted signal to a network headend controller. The transmitted signal is received by a receiver appliqué coupled to the headend controller. It is then downconverted to a third frequency, and applied to the headend controller by the receiver appliqué.

U.S. Pat. No. 6,362,738, issued to Vega on Mar. 26, 2002, teaches the use of a plurality of detector circuits operating at different frequencies to permit a tag reader to respond to either RFID tags or EAS tags. U.S. Pat. No. 7,359,672, issued to Lynch, discloses providing combined EAS and RFID functionality in a tag communication system. The Lynch system uses much of the same circuitry for multiplying, upconverting and downconverting radio frequency signals in a system for converting the signals to different frequencies. The frequency conversion disclosed by Lynch includes conversion between microwave and millimeter signals. U.S. Pat. No. 6,658,237, issued to Rozenblit on Dec. 2, 2003, discloses using a tunable local oscillator for producing multiple retransmission bands from a baseband signal. For example, the retransmission bands can be the different frequency bands assigned to different cells in a mobile telephone communication system, such as frequencies in the range of 890 Mhz to 960 MHz. U.S. Patent Publication No. 2009/0117938 A1, filed on Nov. 2, 2007 by Georgantas, discloses a system with a plurality of receive frequencies and a plurality of transmit frequencies. However, none of the foregoing references disclose a system or method for converting tag reader devices operating at one frequency into tag reader devices capable of operating at different frequencies.

Thus, there remains a need for a method for conveniently converting tag readers operating at one frequency into tag readers capable of operating at different frequencies.

All references cited herein are incorporated herein by reference in their entireties.

BRIEF SUMMARY OF THE INVENTION

A module includes a first receiver port configured to receive a reader transmit signal at a first frequency and a first frequency converter configured to convert the reader transmit signal to a second frequency to provide a converted reader transmit signal, the second frequency differing from the first frequency. A first transmit port is configured to transmit the converted reader transmit signal to a tag. A second receiver port is configured to receive a tag transmit signal from a tag. A second frequency converter is configured to convert the tag transmit signal to the first frequency to provide a converted tag transmit signal. A second transmit port is configured to transmit the converted tag transmit signal to the reader. A baseband converter converts the reader transmit signal to provide a baseband transmit signal. The reader transmit signal is an encoded reader transmit signal and the baseband transmit signal is an encoded baseband transmit signal. Decoder circuitry decodes the encoded baseband transmit signal to provide a decoded baseband signal. The reader transmit signal is encoded with a first coding scheme and encoding circuitry encodes the decoded baseband signal with a second encoding scheme differing from the first encoding scheme to provide a further encoded baseband signal.

A tag security system having a tag, includes a frequency converter module configured to be coupled to: (i) a directly mated transmit plug that is directly mated with a transmit antenna port of a tag reader operating at a first frequency, and (ii) a directly mated receive plug that is directly mated with a receive antenna port of the tag reader. The frequency converter module includes a transmit frequency converter circuitry for receiving a transmit signal at the first frequency from the tag reader by way of the directly mated transmit plug, converting the transmit signal to a second frequency differing from the first frequency to provide a converted transmit signal, and transmitting the converted transmit signal to the tag. Additionally, the frequency converter module includes receive frequency converter circuitry that receives a receive signal at the second frequency from the tag, converts the receive signal to the first frequency to provide a converted receive signal, and applies the converted receive signal to the tag reader by way of the directly mated receive plug.

A communication method in a tag security system having a tag includes providing a tag reader operating at a first frequency and having a transmit antenna port and a receive antenna port, providing a frequency converter module having a transmit plug and a receive plug adapted to directly mate with the transmit port and the receive port, respectively, and directly mating the transmit plug with the transmit port and the receive plug with the receive port to provide a directly mated transmit plug and a directly mated receive plug. A transmit signal at the first frequency is received from the tag reader by the frequency converter module by way of the directly mated transmit plug and the transmit signal is converted to a second frequency differing from the first frequency to provide a converted transmit signal. The converted transmit signal is transmitted to the tag by the frequency conversion module. A receive signal is received from the tag at the second frequency and the receive signal is converted to the first frequency to provide a converted receive signal. The converted receive signal is applied by the frequency conversion module to the tag reader by way of the directly mated receive plug.

The transmit signal is baseband downconverted to provide a downconverted baseband transmit signal. The transmit signal is an encoded transmit signal, the downconverted baseband transmit signal is an encoded baseband signal, and the encoded baseband signal is decoded to provide a decoded baseband signal. Clock recovery is performed on the decoded baseband signal. The transmit signal is encoded with a first coding scheme and the decoded baseband signal is encoded with a second encoding scheme differing from the first encoding scheme to provide a further encoded baseband signal. The further encoded baseband signal is transmitted by the frequency converter module.

The first frequency can be an EAS frequency, and the second frequency can be an RFID frequency. The first frequency can be an RFID frequency, and the second frequency can be an EAS frequency. The second frequency can be a wireless frequency such as the WiFi wireless frequencies of 2.4 GHz, 3.6 GHz and 5 GHz. Communication is provided between the tag reader and a computer by way of the wireless frequency. Antitheft operations are monitored by the computer by way of the wireless system. Logistical operations are monitored by the computer by way of the wireless system. Communication is provided between the tag and the internet by way of the wireless frequency.

A further frequency converter module is provided, and the transmit signal is converted to a third frequency differing from the first and second frequencies to provide a further converted transmit signal. The further converted transmit signal is transmitted to a tag by the further frequency conversion module. Communication with a combination tag is provided by way of the first frequency and the third frequency. Communication with a combination tag is provided by way of the second frequency and the third frequency. The converted transmit signal is transmitted to a further tag reader by the frequency conversion module.

An EAS to RFID converter module coupled to the preexisting transmit antenna port of an EAS reader receives an 8.2 MHz EAS transmit signal from the EAS reader. The 8.2 MHz EAS signal received by the EAS to RFID converter module is the signal that would be transmitted to an EAS tag by an EAS antenna plugged into the reader transmit antenna port, if the EAS reader is not converted into an RFID reader by the EAS to RFID converter module of the invention. The EAS to RFID converter module upconverts the 8.2 MHz EAS transmit signal from the reader transmit port to a 900 MHz RFID signal, and transmits the resulting upconverted 900 MHz RFID signal to an RFID tag.

The EAS to RFID converter module is coupled to the preexisting receive antenna port of the EAS reader for receiving a 900 MHz RFID signal from an REID tag, downconverting the 900 MHz RFID receive signal to an 8.2 MHz EAS signal, and applying the downconverted 8.2 MHz EAS signal to the receive antenna port of the EAS reader. The 8.2 MHz EAS signal received by the reader from the EAS to RFID converter module is the kind of signal that would be received by an antenna plugged into the reader receive port, if the EAS reader is not converted into an RFID reader by the EAS to RFID converter module.

In another embodiment of the invention, an RFID to EAS converter module is coupled to the transmit and receive antenna ports of an RFID reader, for converting the frequencies of transmitted and received signals, in order to provide EAS functionality to the RFID reader. In this embodiment, the RFID to EAS converter module receives a 900 MHz RFID transmit signal from the preexisting transmit antenna port of the RFID reader. The 900 MHz RFID signal received from the reader is the signal that would be transmitted by an antenna plugged into the transmit port, if the RFID reader is not converted into an EAS device by an RFID to EAS converter module. The RFID to EAS converter module downconverts the 900 MHz RFID transmit signal to an 8.2 MHz EAS signal, and transmits the resulting downconverted 8.2 MHz EAS signal to an EAS tag. EAS signals received from the tag by the RFID to EAS converter module are upconverted and applied to the receive antenna port of the RFID reader.

BRIEF DESCRIPTION OF SEVERAL VI WS OF THE DRAWINGS

The invention will be described in conjunction with the following drawings in which like reference numerals designate like elements and wherein:

FIG. 1 shows a schematic representation of an embodiment of a frequency converter system including an embodiment of the frequency converter module of the present invention for use within tag communication systems.

FIG. 2 shows a schematic representation of a frequency converter system including an alternate embodiment of the frequency converter module of FIG. 1.

DETAILED DESCRIPTION OF THE INVENTION

Figure 3:
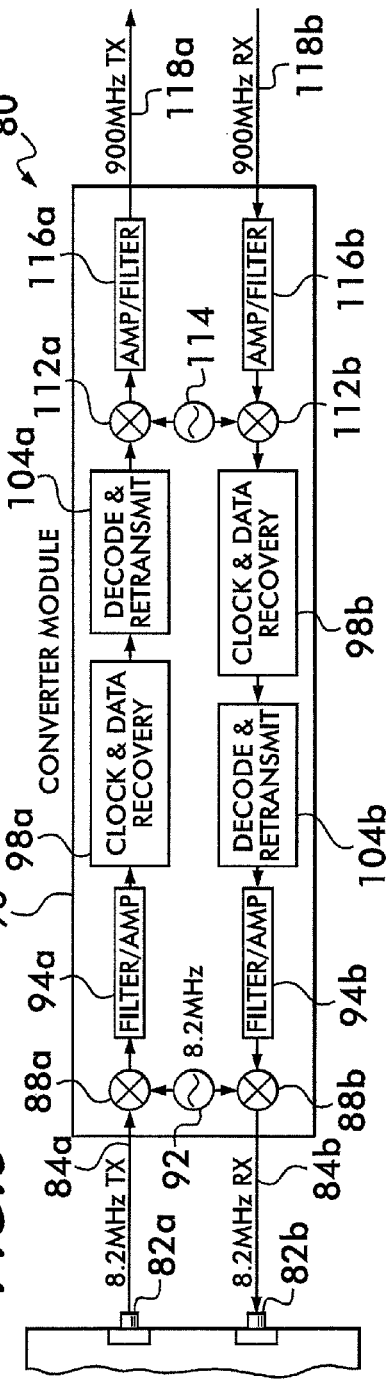
FIG. 3 shows a schematic representation of a frequency converter system including an alternate embodiment of the frequency converter module of FIG. 1.

Referring now to FIG. 1, there is shown a schematic representation of the frequency converter system 10 of the present invention for use within tag communication systems. The frequency converter system 10 includes a transmit/receive EAS reader 12 having antenna ports 14a,b. The antenna port 14a can be a transmit antenna port suitable for mating with an EAS transmit antenna, and the antenna port 14b can be a receive antenna port suitable for mating with an EAS receive antenna.

The frequency converter system 10 also includes a frequency converter module 30. The frequency converter module 30 is provided with a transmit cable 18a and a receive cable 18b, which can be attached to respective ports on the frequency converter module 30. The cables 18a,b have respective plugs 16a,b. The transmit plug 16a can mate directly with the transmit antenna port 14a of the EAS reader 12, for receiving a transmit signal from the transmit antenna port 14a, and applying the transmit signal to a receiver port of the frequency converter module 30 by way of the transmit cable 18a. The transmit signal received by the transmit plug 16a is substantially the same transmit signal that would be received by a transmit antenna if a transmit antenna is coupled to the transmit antenna port 14a. The transmit signal can be, for example, an 8.2 MHz signal. Additionally, the receive plug 16b can mate directly with the antenna receive antenna port 14b for applying a receive signal from a transmit port of the frequency converter module 30 to the receive antenna port 14b of the EAS reader 12. The receive signal applied by the receive plug 16b is substantially the same receive signal that would be applied by a receive antenna if a receive antenna is coupled to the receive antenna port 14b.

The transmit signal received from the EAS reader 12 by way of the directly mated transmit plug 16a is applied to a first frequency converter including the upconverter 22a within the frequency converter module 30 for upconversion. A conventional upconverting mixer can perform the upconverting within the upconverter 22a. An 8.2 MHz transmit signal from the EAS reader 12 can be upconverted to a 900 MHz transmit signal. If the upconverted transmit signal is a 900 MHz signal, an 891.8 MHz local oscillator can be used for upconversion by the upconverter 22a. The upconverted transmit signal from the upconverter 22a can be filtered and amplified by the filter/amplifier 34a. Filtering by the filter/amplifier 34a is useful for lowering the noise of the upconverted transmit signal and removing the jitter from the transmit signal. The amplification is preferably very low noise amplification, since mixers within upconverter and downconverter circuitry typically have a high noise figure and can add significant noise to the signals. The filtered and amplified signal from the filter/amplifier 34a is then applied by way of a transmit port of the frequency converter module 30 and the transmit cable 36a to a transmit antenna (not shown) for transmission to a tag.

Additionally, a 900 MHz antenna (not shown) can receive a 900 MHz signal from a tag, and apply the receive signal to the frequency converter module 30 of the frequency converter system 10 by way of the receive cable 36b and a receiver port of the frequency converter module 30. The receive signal from the receive cable 36b can be bandpass filtered, to remove any out of band signals, and amplified by the filter/amplifier 34b. The filtered and amplified receive signal can then be downconverted by a second frequency converter including the downconverter 22b. The downconverter 22b can use the previously described 891.8 MHz local oscillator 26 to perform the downconversion of the receive signal. The downconverted signal from the downconverter 22b can be applied to the receive antenna port 14b of the EAS reader 12 by way of the receive cable 18b and the directly mated receive plug 16b.

Thus, the frequency converter module 30 of the frequency converter system 10 can be coupled directly to the preexisting transmit and receive antenna ports 14a,b of the EAS reader 12 for performing frequency conversions using first and second frequency converters. For example, if the EAS reader 12 is an 8.2 MHz device, the frequency conversion module 30 can include frequency converters to adapt the reader 12 to send and receive signals with 900 MHz tags. The preexisting transmit port 14a and the preexisting receive port 14b of the EAS reader 12 are ports on the reader that are originally adapted to be coupled to 8.2 MHz transmit and receive antennas for transmitting and receiving 8.2 MHz radio frequency signals. The plugs 16a,b on the cables 18a,b are adapted to directly mate with the preexisting ports 14a,b in substantially the same manner that the 8.2 MHz transmit and receive antennas would mate with the preexisting ports 14a,b if the tag reader 12 is used in an 8.2 MHz communication system. The frequency converter module 30 is thus adapted to plug directly into the preexisting ports of the tag reader 12, where the transmit and receive antennas would be plugged, in order to convert the tag reader 12 for use in a 900 MHz system, without any modifications of the tag reader 12.

In one embodiment of the frequency converter module 30 the RFID signals can be frequency hopped. For example, the RFID signals can be frequency hopped over a range of 902 MHz to 928 MHz, under the control of the tag reader 12. The hopping can occur with a predetermined period, for example, every 400 millisecond, over a predetermined number of channels, for example over fifty channels. The tag reader 12 can use a preexisting control channel within the tag reader 12, for example a general purpose input/output port, to apply control signals to the frequency converter module 30 regarding when to hop and which channels to hop to. Additionally, the tag reader 12 can apply the control signals to the frequency converter module 30 by way of a data port. In the later case, the control signals and the data signals can be separated in frequency. For example, the tag reader 12 can send the data over an 8.2 MHz channel while sending the control signals between DC and 100 KHz.

Referring now to FIG. 2, there is shown a schematic representation of the frequency converter system 40. The frequency converter system 40 is an alternate embodiment of the frequency converter system 10. A transmit/receive tag reader 42 operating at a first frequency is provided with a frequency converter module 50 within the frequency converter system 40 for adapting the tag reader 42 to operate at a second frequency different from the first frequency. Additionally, baseband downconversion and decoding functionality are provided within the frequency converter module 50.

In the frequency converter system 40 a transmit signal from the EAS reader 42 is coupled to the baseband downconverter 72a within the frequency converter module 50 by way of a transmit cable 48a having a transmit plug 46a. The transmit plug 46a mates directly with a preexisting transmit port 44a of the EAS reader 42 to receive the transmit signal from the transmit port 44a. The transmit signal received by way of the transmit port 44a can be any frequency. For example, the transmit signal can be an 8.2 MHz signal. The baseband downconverter 72a downconverts the transmit signal to the baseband using an 8.2 MHz local oscillator 74 in order to permit it to be decoded. The downconverted baseband transmit signal is applied to the filter/amplifier 76a.

The filtered and amplified baseband signal from the filter/amplifier 76a in the frequency converter module 50 can then be applied to the decode and retransmit block 78a for decoding and retransmission. The decoding performed within the frequency converter system 40 by the decode and retransmit block 78a can be any kind of decoding known to those skilled in the art. For example, the decoding can be CDMA decoding. The use of CDMA encoding and decoding in modulated backscatter systems, including the use of the CDMA encoding for range extension, is disclosed in more detail in copending U.S. application Ser. No. 12/406,629, filed on Mar. 18, 2009, which is incorporated by reference herein. After the decoding, the signal can be reencoded and prepared for retransmission within the decode and retransmit block 78a.

The decode and retransmit block 78a can be used to convert from one type of code to another, by recoding a signal in a different code after it is decoded. This can be useful where coding schemes in one frequency are not suitable for use in another frequency, for example because of the different coding complexities permitted at the different transmit and receive frequencies. In another embodiment, a signal can be decoded by the decode and retransmit block 78a, and retransmitted with no reencoding. Additionally, a signal with no encoding can be received by the decode and retransmit block 78a and retransmitted with encoding. In another embodiment, the decode and retransmit block 78a can be disabled and the signal can be prepared for retransmission without performing any decoding or encoding operations.

The retransmission signal from the decode and retransmit block 78a can be upconverted by the upconverter 52a using the local oscillator 56. For example, the retransmission signal from the decode and retransmit block 78*a* can be upconverted to 900 MHz using a 900 MHz local oscillator 56. The upconverted signal from the upconverter 52*a* is amplified and filtered by the amplifier/filter 64*a* for removing noise and jitter. The amplified and filtered signal is then transmitted by the frequency converter system 40 using a transmit antenna (not shown) coupled to the transmit cable 66*a*.

A receive signal can be received from a tag and applied to the amplifier/filter 64*b* of the frequency converter module 50 by way of an antenna (not shown) coupled to the receive cable 66*b*. In one embodiment of the invention the receive signal can be a 900 MHz signal. The amplified and filtered receive signal from the amplifier/filter 64*b* can then be downconverted to baseband using the downconverter 52*b*. The downconverted baseband receive signal can be decoded by the decode and retransmit block 78*b*. The operations performed within the decode and retransmit block 78*b* can include any kind of decoding and encoding known to those skilled in the art, as previously described.

After the decoding or reencoding, the signal can be prepared for retransmission within the decode and retransmit block 78*b*. In an alternate embodiment, the signal can be prepared for retransmission without performing any decoding operations. The retransmission signal is filtered and amplified in filter/amplifier 76*b*, downconverted by downconverter 72*b*, and applied to the preexisting receive antenna port 44*b* of the EAS reader 42 by way of the receive cable 48*b* and the directly mated receive plug 46*b*.

Referring now to FIG. 3, there is shown a schematic representation of the frequency converter system 80, including the frequency converter module 90, which is an alternate embodiment of the frequency converter modules 30, 50. In the frequency converter module 90 a transmit signal from an EAS reader is coupled to the baseband downconverter 88*a* by way of a transmit cable 84*a* having a transmit plug 82*a*. The transmit plug 82*a* plugs into a preexisting transmit port of the EAS reader. The transmit signal can be, for example, an 8.2 MHz signal. The baseband downconverter 88*a* downconverts the transmit signal to the baseband using an 8.2 MHz local oscillator 92. The downconverted baseband transmit signal is applied to the filter/amplifier 94*a*. Clock recovery and data recovery (CDR) can be performed on the signal from filter/amplifier 94*a* within the CDR block 98*a* of the frequency converter module 90 in order to improve the quality of the data and the signal integrity of the transmit signal.

The filtered and amplified baseband signal from the CDR block 98*a* in the frequency converter module 90 can then be applied to the decode and retransmit block 104*a* for decoding and retransmission. In an alternate embodiment, the signal can be prepared for retransmission without performing any decoding operations. The retransmission signal from the decode and retransmit block 104*a* can be upconverted by the upconverter 112*a* using the local oscillator 114. The upconverted signal from the upconverter 112*a* is amplified and filtered by the amplifier/filter 116*a* and transmitted by way of an antenna (not shown) coupled to the transmit cable 118*a*.

A receive signal can be received and applied to the amplifier/filter 116*b* of the converter 80 by way of an antenna (not shown) coupled to the receive cable 118*b*. The amplified and filtered receive signal from the amplifier/filter 116*b* can then be downconverted to baseband using the downconverter 112*b*. CDR can be performed on the baseband signal within the CDR block 98*b* of the frequency converter module 90 in order to improve the quality and the data and the signal integrity of the receive signal. The signal can then be decoded by the decode and retransmit block 104*b*. The decoding within the decode and retransmit block 104*b* can be any kind of decoding known to those skilled in the art.

After the decoding, the signal can be prepared for retransmission within the decode and retransmit block 104*b*. The retransmission signal is filtered and amplified in filter/amplifier 94*b*, downconverted by downconverter 88*b*, and applied to the preexisting receive antenna port of the EAS reader by way of the receive cable 84*b* and the receive plug 82*b*.

Thus, it will be understood by those skilled in the art, that the system and method of the present invention include frequency converter modules that are coupled directly to the preexisting transmit and receive antenna ports of tag readers, for performing frequency conversion. The preexisting transmit and receive ports in the present invention can be ports provided on the readers at the time of the manufacture of the readers. The preexisting ports can be originally adapted to mate with transmit and receive antennas, for transmitting and receiving the frequency signals of the tag readers. The plugs of the frequency converter modules of the invention are adapted to plug directly into the preexisting ports at the location, where the transmit and receive antennas would be plugged, if the frequency converter modules were not used. Thus, modifications of the reader ports are not needed in order to provide the frequency conversions of the invention.

In one embodiment of the invention, an EAS to RFID frequency converter module can be coupled to the transmit and receive antenna ports of an EAS reader, for converting the frequencies of the transmitted and received signals, in order to provide RFID functionality to the EAS reader. For example, the frequency converter modules 30, 50 are shown as frequency converter modules for converting between EAS and RFID as required to provide RFID functionality to EAS readers.

However, in another embodiment of the invention, an RFID to EAS converter module can be coupled to the transmit and receive antenna ports of an RFID reader. Such a frequency converter module can convert the frequencies of the transmitted and received signals of the RFID reader to provide EAS functionality to the RFID reader. In this embodiment, the RFID to EAS converter module receives a 900 MHz RFID transmit signal from a preexisting RFID reader transmit antenna port. The 900 MHz RFID signal received by the RFID to EAS converter module is the signal that would be transmitted by an RFD antenna plugged into the transmit port, if the RFID reader is not converted into an EAS device by the RFID to EAS converter module. The RFID to EAS converter module downconverts the 900 MHz RFID transmit signal to an 8.2 MHz EAS transmit signal, and transmits the resulting downconverted 8.2 MHz EAS signal to an EAS tag. In an alternate embodiment of the invention the 900 MHz RFID transmit signal can be decoded and retransmitted prior to conversion to an EAS signal.

The RFID to EAS converter module coupled to the preexisting receive antenna port of the RFID reader receives an 8.2 MHz signal from the EAS tag, upconverts the 8.2 MHz signal receive to an 900 MHz RFID signal, and applies the upconverted signal to the preexisting receive antenna port of the RFID reader. The receive signal can be decoded and retransmitted prior to being applied to the RFID receive port.

Thus, the frequency converter modules of the invention provide the advantage of performing the foregoing frequency conversions by directly coupling to the preexisting antenna ports, thereby allowing easy conversions from, for example, EAS to RFID, and from RFID to EAS. The frequency converter modules include mixers, filters, amplifiers and other circuitry as needed in order to perform the required upconversions, downconversions, encoding, decoding and retransmissions.

Furthermore, it will be understood that frequency converter modules converting between any other frequencies can also be provided according to the invention. This includes converter modules for converting between all of the frequencies that are conventionally used for communication with tags. For example, the Table below shows many of the frequencies that can be used in tag communications systems. The system and method of the present invention can perform frequency conversions between any of the frequencies shown, including conversions between different EAS frequencies and conversions between different RFID frequencies, as well as between EAS and RFID frequencies.

TABLE

| EAS Operation | | RFID Operation | |
|---|---|---|---|
| Low Frequency (LF) | 5 kHz-14 kHz | High Frequency (HF) | 2 MHz-14 MHz |
| Acousto-Magnetic (AM) | 50 kHz-70 kHz | Ultrahigh Frequency (UHF) | 850 MHz-950 MHz |
| Radio Frequency (RF) | 2 MHz-14 MHz | Microwave Frequency | 2.3 GHz-2.6 GHz |

Additionally, the system and method of the present invention can include frequency conversion modules for converting between any of the known tag frequencies, and any other frequencies not conventionally used in tag communication systems, such as WiFi frequencies, as discussed in more detail below. Additionally, converter modules can be provided for converting between the frequency of the tag reader and multiple frequencies, as discussed in more detail below.

Figure 4:
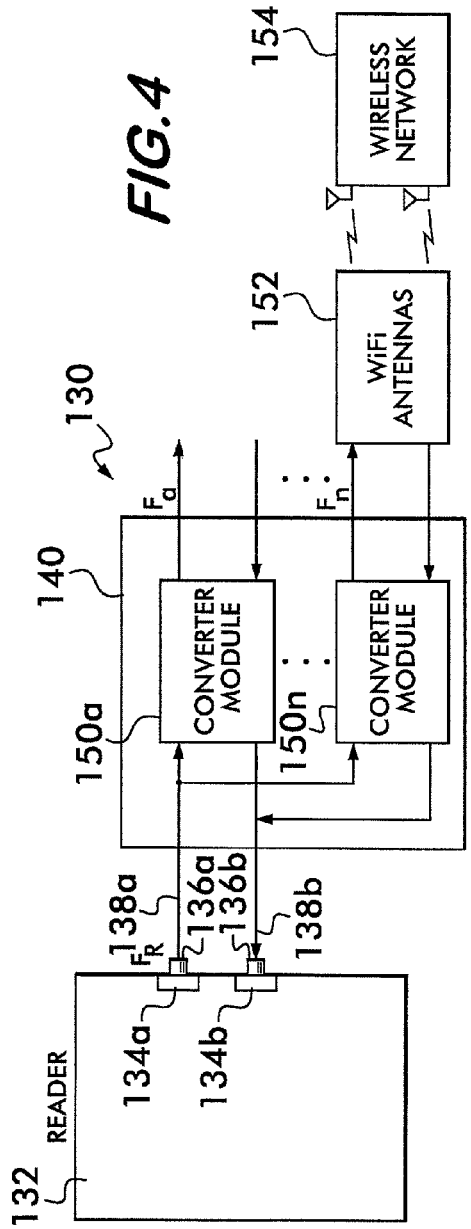
FIG. 4 shows a schematic representation of an alternate embodiment of the frequency converter system of FIG. 1.

Referring now to FIG. 4, there is shown a schematic representation of the multifrequency converter system 130. The multifrequency converter system 130 includes a transmit/receive tag reader 132, which can be any type of tag reader operating at a frequency $F_R$. The frequency $F_R$ can be any tag frequency known to those skilled in the art. For example, the frequency $F_R$ can be 8.2 MHz, 860 MHz, 900 MHz, 915 MHz or 950 MHz. A transmit signal at frequency $F_R$ is received from the tag reader 132 at the transmit port 134a by the transmit plug 136a and the directly mated transmit cable 138a, in the manner described above. Additionally, a receive signal at the frequency $F_R$ is applied to the receive port 134b of the tag reader 132 by way of the directly mated receive cable 138b and the receive plug 136b.

The multifrequency converter system 130 also includes the converter module group 140. The converter module group 140 can include any number n of frequency converter modules 150a-n, operating at their respective frequencies $F_a$ through $F_n$. The frequencies $F_a$ through $F_n$ can be any frequencies whatsoever. Thus, each frequency converter module 150a-n can perform frequency conversions between the frequency $F_R$ of the tag reader 132 and its respective frequency $F_a$ through $F_n$ in the manner previously described. In an alternate embodiment, the tag reader 132 can be provided with a plurality of transmit ports and/or a plurality of receive ports for separately mating with the plugs and cables of the plurality of converter modules 150a-n. Additionally, the tag reader 132 can be converted to provide transmit signals in one frequency and receive signals in another differing frequency using the frequency converter modules of the invention.

Furthermore, the frequencies $F_a$ through $F_n$ are not limited to tag frequencies. For example, it will be understood that any one of the frequencies $F_a$ through $F_n$ can be a wireless frequency such as the WiFi wireless frequencies of 2.4 GHz, 3.6 GHz and 5 GHz. In the embodiment of the converter module group 140 shown, the frequency $F_n$ is a wireless network frequency such as a WiFi network frequency. For example, the frequency $F_n$ can be selected to provide access to networks of configurable monitoring devices of any type thereby providing access to any of the protocols available in the configurable monitoring systems. Such configurable monitoring systems are described in more detail in copending application Ser. No. 12/878,546 filed Sep. 9, 2010 entitled Calibration of Beamforming Nodes in a Configurable Monitoring Device System and Ser. No. 12/879,049 filed Sep. 10, 2010 entitled Localizing Tagged Assets In A Configurable Monitoring Device System, both of which are incorporated by reference herein in their entirety. Thus, the transmit frequency $F_R$ of the tag reader 132 is converted and transmitted to a wireless network 154 by the wireless antennas 152 coupled to the frequency converter module 150n. Additionally, signals from the wireless network 154 are received by the wireless antennas 152, converted to the frequency $F_R$, and applied the tag reader 132 by way of the frequency converter module 150n. In this manner, the tag reader 132 is provided with access to all of the computers, databases, communications protocols, link network protocols and equipment compatibility available in the wireless domain, including access to any type of configurable monitoring devices by providing frequency conversions to and from any frequencies that may be used by such configurable monitoring devices.

In one preferred embodiment of the invention, the frequency $F_R$ can be 900 MHz, the frequency $F_n$ can be a conventional wireless frequency such as 2.4 GHz, and at least one of the remaining frequency converter modules 150a-(n−1) can operate at an EAS frequency such as 8.2 MHz. This system allows the advantages of EAS for loss prevention and antitheft operations in the EAS domain, the logistics operations available in, for example, the 900 MHz RFID domain, and all of the protocols and equipment networking of the WiFi domain. Additionally, such a system can be used with combination EAS/RFID tags, since both 900 MHz and 8.2 MHz transmission and reception are available for communication with such tags.

Figure 5:
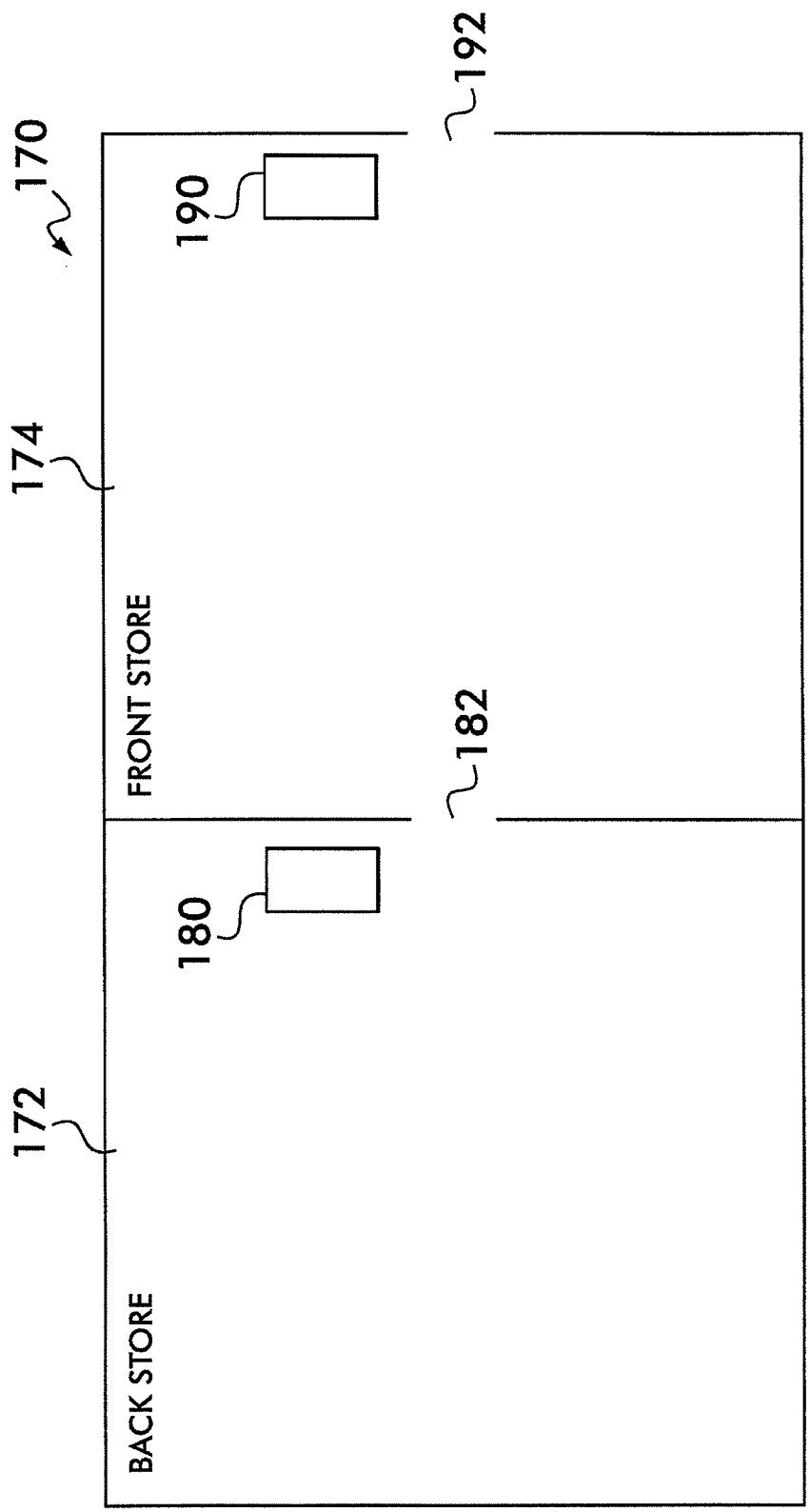
FIG. 5 shows a schematic representation of a retail space using the frequency converter system of FIG. 4.

Referring now to FIG. 5, there is shown a schematic representation of a retail space 170. The retail space 170 includes a back store region 172 and a front store region 174. The back store region 172 and the front store region 174 are separated by a wall with a portal 182, through which store personnel and items to be tracked can pass. A transmit/receive tag security system 180 can be located at the portal 182 for logistical monitoring, such as the monitoring of the movement of the items to be tracked and, in some embodiments, the movement of the store personnel through the portal 182. The logistical operations monitored by the tag security system 180 can be any kind of logistical operations known to those skilled in the art. In a preferred embodiment, the tag security system 180 can be a 900 MHz transmit/receive system, since 900 MHz systems are well suited to performing such logistical monitoring. The front store region 174 has a gate 192 through which shoppers and items to be tracked can pass. Additionally, a transmit/receive tag security system 190 can be located at the gate 192 in order to deter theft of the items to be tracked.

The tag security system 190 can be a multifrequency converter system having a plurality of frequency converter modules, such as the multifrequency converter system 130 described above. In a preferred embodiment of the invention, the frequency of the tag reader within a multifrequency tag security system 190 can be 900 Mhz. One frequency converter module within the multifrequency tag security system 190 can be an 8.2 MHz frequency converter module. Another frequency converter module within the multifrequency tag security system 190 can be a 2.4 GHz converter. In this manner, the 8.2 MHz frequency converter module can be used for antitheft monitoring at the gate 192. The 900 MHz tag reader in the tag security system 190 at the gate 192 can be adapted to communicate with the tag security system 180 at the portal 182. Additionally, the tag reader and the frequency conversion modules in the tag security system 190 can be used to monitor combination EAS/RFID tags in the vicinity of the gate 192, if such tags are used.

Furthermore, a 2.4 GHz frequency converter module within the multifrequency tag security system 190 can couple the tag security systems 180, 190 to a WiFi network. In this manner, the logistical operations and the antitheft operations of the tag security systems 180, 190 can be coupled to any computers, databases and other equipment available to the retail space 170. Additionally, the operations of the tag security systems 180, 190 can be coupled to the internet by way of the 2.4 GHz.

Figure 6:
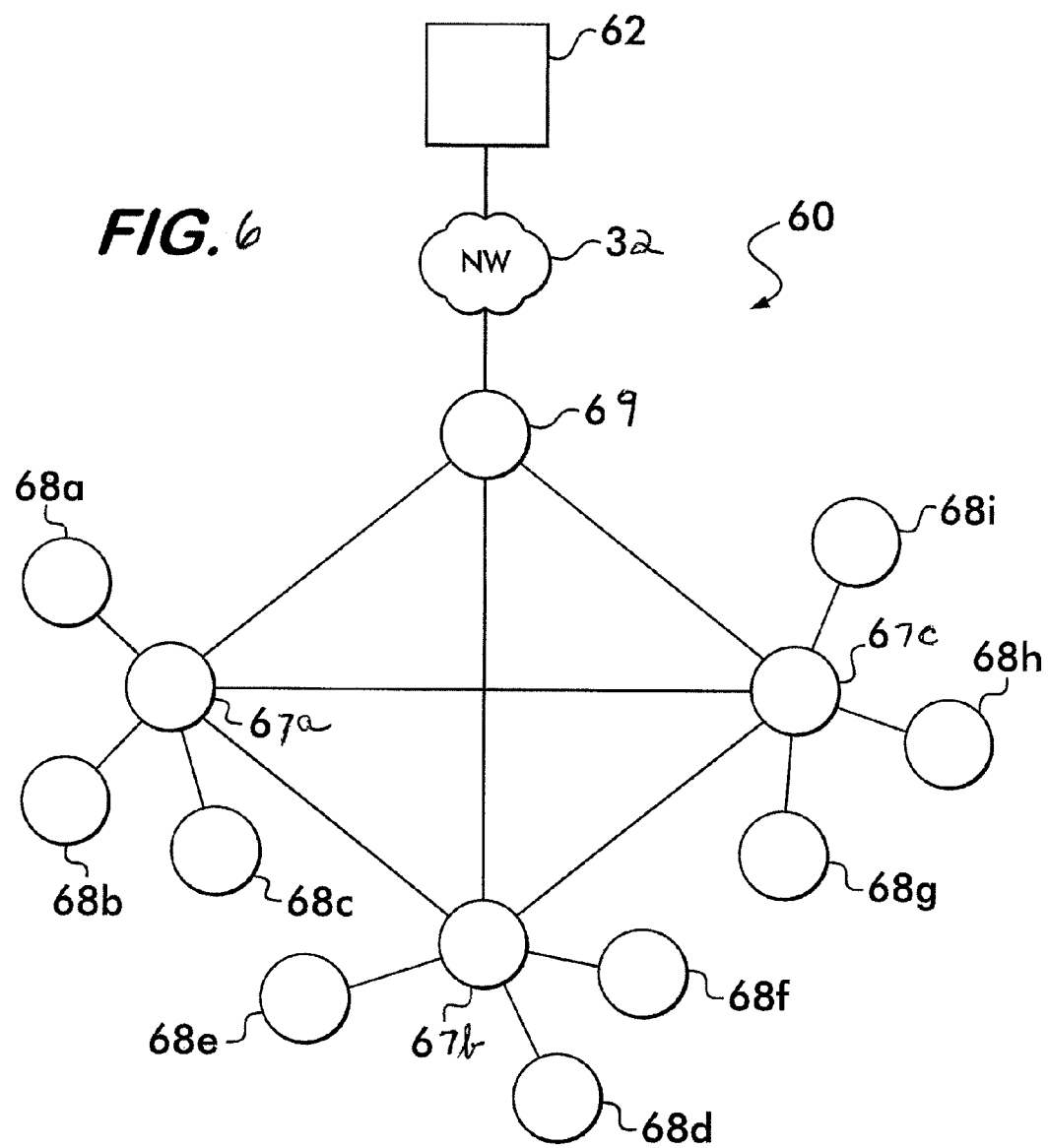
FIG. 6 shows a schematic representation of the frequency converter system of FIG. 1 within a configurable monitoring device system.

Referring now to FIG. 6, there is shown a configurable monitoring system 60 that includes a number of configurable monitoring devices in various roles, including at least one configurable monitoring device configured to operate as a frequency conversion module of the invention. Additionally, any of the devices 68a-68i may be configurable monitoring device tags affixed to a product for the purpose of supporting security, inventory, marketing, as well as other functionalities. Network activity nodes 67 (e.g., nodes 67a-67c) may be configured to support network level activities such as communications routing, tag locating, and the like.

Gateway node 69 may be configured as a gateway node to provide a network interface between the monitoring system 60 and the external network 32. A monitoring terminal 62 may be in communication with the gateway node 69, for example, via the external network 32 or via a direct connection to the gateway node 69, to facilitate management of the configurable monitoring devices by the monitoring terminal 62 and to further facilitate the aggregation and analysis of data received from the configurable monitoring devices. A gateway node may interface with a cellular network to gain access to other networks, such as the Internet. In some example embodiments, a gateway node may support USB and Ethernet connectivity for connection to USB or Ethernet networks.

The gateway node 69 may also include or be associated with a network coordinator. The network coordinator may be configured to oversee and manage various network operations. For example, the network coordinator may implement the forming of the network, allocate network addresses to entities of the network, and maintain a binding table for the network.

In some cases, the monitoring system 60 may be made up of a plurality of communication devices (e.g., such as a plurality of configurable monitoring devices) in communication with each other via device-to-device communication to form a mesh network. However, in other situations, the network may include a plurality of devices that transmit signals to and receive signals from a base site or access point, which could be, for example a base site or access point of a data network, such as a local area network (LAN), a metropolitan area network (MAN), and/or a wide area network (WAN), such as the Internet.

Other devices such as processing elements or devices (e.g., personal computers, server computers, displays, point of sale (POS) terminals and/or the like) may be coupled to a configurable monitoring device to access the monitoring system 60. By directly or indirectly connecting the configurable monitoring devices to various network devices and/or to other configurable monitoring devices via the monitoring system 60, the configurable monitoring devices may be enabled to receive configuration modifications dynamically and perform various functions or tasks in connection with network devices or other configurable monitoring devices based on the current configuration of the configurable monitoring devices.

The configurable monitoring devices may support any type of RFID communications within the frequency converter systems 10, 40, 80, 130, such as communications based frequencies within the on Generation II Ultra High Frequency (UHF) RFID standards. In example embodiments where a configurable monitoring device includes a radio (e.g., an IEEE 802.15.4 radio) and an RFID module, the configurable monitoring device may be configured to operate as an interface that allows RFID devices to access the monitoring system 60. For example, an RFID reader or other RFID device, that does not include a configurable monitoring device, may communicate with a configurable monitoring device, such as a tag, and the configurable monitoring device may relay such communications to entities connected to the monitoring system. In the same manner, the tag may relay communications originating on the monitoring system to an RFID device that has interfaced with a tag. As such, the configurable monitoring devices may operate as gateways to the monitoring system for RFID communications.

The monitoring system 60 may be configured to operate as a mesh network or a hybrid mesh network. In some example embodiments, the monitoring system is configured in a star network structure, a hybrid star network structure, a cluster tree or the like. In this regard, the monitoring system 60 may support message hopping and network self-healing. With respect to message hopping, the nodes 67 may be configured to receive communications from nearby or assigned tags 68. The nodes 67 may be configured to determine a system architecture and/or efficient pathways for communicating messages to the various entities within the network. In this regard, the nodes 67 may be configured to generate and maintain routing tables to facilitate the efficient communication of information within the network.

For example, in accordance with implemented marketing functionality, tag 68h may be configured to communicate that the product that tag 68h is affixed to has been moved from its display location. Tag 68h may be configured to communicate this information to tags 68g and 68d, because the products affixed to tags 68g and 68d are related products that a customer may be interested in purchasing, given the customer's apparent decision to purchase the product affixed to tag 68h. Accordingly, tag 68h may generate and transmit a message addressed to tags 68g and 68d. The message may be received by node 67c, and node 67c may be configured to determine how to route the message, given current network traffic, such that the message is efficiently received by tags 68g and 68d. For example, using generated routing tables, node 67c may determine that the message can first be transmitted directly to tag 68g, since tag 68g is connected to or in direct communication with the node 67c. To transmit the message to tag 68d, node 67c may determine that the message should be forwarded to node 67b. Node 67b may perform a similar analysis and determine that the message can be forward to tag 68d, directly from node 67b. Tag 68h may also be configured to transmit the message to the monitoring terminal 62. Node 67c may route the message accordingly, such that the gateway 64 may forward the message to the monitoring terminal 62.

As indicated above, the nodes 67 may be configured to perform communications routing within the monitoring system 60. In this regard, nodes 67 may operate to extend the range of the monitoring system. However, according to some example embodiments, all configurable monitoring devices within the monitoring system 60 may be configured to perform routing functionality. As such, configurable monitoring devices configured to operate both as tags and as nodes may communicate directly with each other, if within range, without having to route the communications through another node. Nodes within the monitoring system 60 may also be configured to operate as beamforming nodes, calibration nodes, or localizing nodes.

Additionally, the monitoring system 60 may be configured to compensate for interference and multi-path conditions that can arise in enclosed environments, such as retail stores. To do so, the monitoring system 60 may be configured, for example by the monitoring terminal 62, to modify the signal power of select nodes and tags to minimize interference. According to some example embodiments, directional antennas may also be used by configurable monitoring devices to minimize interference.

According to various example embodiments, the monitoring system 60 may be configured to interface with any number of other types of networks and/or systems. For example, the monitoring system 60 may interface with EAS systems, RFD systems, closed circuit television systems, inventory systems, security systems, sales systems, shipping systems, point of sale terminals, advertising systems, marketing compliance systems, ordering systems, restocking systems, virtual deactivation systems, Lojack® systems, and the like.

Based on the foregoing, and in accordance with some example embodiments, the nodes may be configured to provide a wireless signal that may be received by tags that are within range. According to some example embodiments, the range of a node or the power of the signal provided by the node may be set based on the size of the area that the node is responsible for. For example, if the node is associated with a small floor display, the signal power may be relatively low. On the other hand, if a node is responsible for a large shelf unit, the signal power may be set to a higher level to ensure coverage of the entire shelf unit.

While the invention has been described in detail and with reference to specific examples thereof, it will be apparent to one skilled in the art that various changes and modifications can be made therein without departing from the spirit and scope thereof.

What is claimed is:

1. An apparatus for use in a tag security system having a tag, comprising:
    a frequency converter module configured to be coupled to (i) a transmit plug directly mated with a transmit antenna port of a tag reader operating at a first frequency to provide a directly mated transmit plug, and (ii) a receive plug directly mated with a receive antenna port of the tag reader to provide a directly mated receive plug;
    the frequency converter module having a transmit frequency converter for receiving a reader transmit signal at the first frequency from the tag reader by way of the directly mated transmit plug, converting the reader transmit signal to a second frequency differing from the first frequency to provide a converted reader transmit signal, and transmitting the converted reader transmit signal to a tag; and
    a receive frequency converter for receiving a tag transmit signal at the second frequency from the tag, converting the tag transmit signal to the first frequency to provide a converted tag transmit signal, and applying the converted tag transmit signal to the tag reader by way of the directly mated receive plug.

2. The apparatus of claim 1, further comprising a baseband converter for converting the reader transmit signal to provide a baseband transmit signal.

3. The apparatus of claim 1, wherein the reader transmit signal is an encoded reader transmit signal and the baseband transmit signal is an encoded baseband transmit signal further comprising decoder circuitry for decoding the encoded baseband signal to provide a decoded transmit baseband signal.

4. The apparatus of claim 3, wherein the reader transmit signal is encoded with a first coding scheme and the decoded baseband signal is encoded with a second encoding scheme differing from the first encoding scheme to provide a further encoded baseband signal.

5. The apparatus of claim 1, wherein the second frequency comprises a wireless frequency further comprising a communication between the tag reader and a computer by way of the wireless frequency.

6. The apparatus of claim 1, comprising a further transmit frequency converter for converting the reader transmit signal to a third frequency differing from the first and second frequencies to provide a further converted reader transmit signal and transmitting the further converted reader transmit signal.

7. The apparatus of claim 6, further comprising a communication with a combination tag by way of the third frequency and at least one of the first and second frequencies.

8. A communication method, comprising:
    providing a frequency converter module configured to be coupled to (i) a transmit plug directly mated with a transmit antenna port of a tag reader operating at a first frequency to provide a directly mated transmit port, and (ii) a receive plug directly mated with a receive antenna port of the tag reader to provide a directly mated receive port;
    receiving a reader transmit signal at the first frequency from the tag reader by the frequency converter module by way of the directly mated transmit plug, converting the reader transmit signal to a second frequency differing from the first frequency to provide a converted reader transmit signal, and transmitting the converted reader transmit signal to a tag; and
    receiving a tag transmit signal from the tag at the second frequency, converting the tag transmit signal to the first frequency to provide a converted tag transmit signal, and applying the converted tag transmit signal to the tag reader by way of the directly mated receive plug.

9. The communication method of claim 8, wherein the first frequency comprises an EAS frequency and the second frequency comprises an RFID frequency.

10. The communication method of claim 8, wherein the first frequency comprises an RFID frequency and the second frequency comprises an EAS frequency.

11. The communication method of claim 8, wherein the second frequency comprises a wireless frequency for providing communication between the tag reader and a computer by way of the wireless frequency.

12. The communication method of claim 8, further comprising converting the transmit signal to a third frequency differing from the first and second frequencies to provide a further converted transmit signal and transmitting the further converted transmit signal to a tag.

13. The communication method of claim 12, further comprising communicating with a combination tag by way of the third frequency and at least one of the first and second frequencies.

* * * * *

UNITED STATES PATENT AND TRADEMARK OFFICE
CERTIFICATE OF CORRECTION

| | | |
|---|---|---|
| PATENT NO. | : 8,547,207 B2 | Page 1 of 1 |
| APPLICATION NO. | : 13/042917 | |
| DATED | : October 1, 2013 | |
| INVENTOR(S) | : Steve Wang and Ben J. Wild | |

It is certified that error appears in the above-identified patent and that said Letters Patent is hereby corrected as shown below:

On the title page, item (73), Assignee "Checkpoint System, Inc." should read "Checkpoint Systems, Inc."

Signed and Sealed this
Twenty-fifth Day of March, 2014

Michelle K. Lee
*Deputy Director of the United States Patent and Trademark Office*